Figure 1:
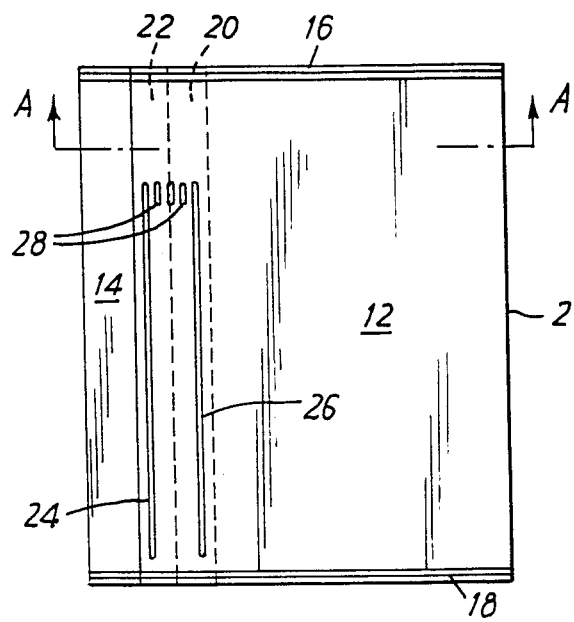

United States Patent [19]

Cowan

[11] Patent Number: 4,560,598
[45] Date of Patent: Dec. 24, 1985

[54] PLASTICS FILM AND BAGS AND SACKS THEREFROM

[75] Inventor: Michael A. Cowan, Much Hadham, England

[73] Assignee: Stiksack STS S.A., Geneva, Switzerland

[21] Appl. No.: 680,601

[22] Filed: Dec. 10, 1984

Related U.S. Application Data

[63] Continuation of Ser. No. 494,559, May 13, 1983, abandoned.

[30] Foreign Application Priority Data

| May 20, 1982 | [GB] | United Kingdom | 8214701 |
| Jun. 3, 1982 | [GB] | United Kingdom | 8216239 |
| Jul. 21, 1982 | [GB] | United Kingdom | 8221127 |
| Dec. 3, 1982 | [GB] | United Kingdom | 8234566 |

[51] Int. Cl.⁴ .................. B65D 65/28; B32B 27/08
[52] U.S. Cl. ...................... 428/35; 428/349; 428/516; 156/244.11
[58] Field of Search .......... 428/35, 516, 349; 525/240; 156/244.11

[56] References Cited

U.S. PATENT DOCUMENTS

| Re. 30,726 | 9/1981 | Otten et al. | 428/516 |
| 3,077,428 | 2/1963 | Heuser et al. | 428/35 |
| 3,424,649 | 1/1969 | Nyberg et al. | |
| 3,833,166 | 9/1974 | Murray | 229/62.5 |
| 4,151,318 | 4/1979 | Marshall | 428/35 |
| 4,346,834 | 8/1982 | Mazumdar | 428/516 |

FOREIGN PATENT DOCUMENTS

| 517215 | 7/1981 | Australia . |
| 0009376 | 4/1980 | European Pat. Off. . |
| 0067138 | 12/1982 | European Pat. Off. . |
| 0080198 | 6/1983 | European Pat. Off. . |
| 2031801 | 11/1970 | France . |
| 1449022 | 9/1976 | United Kingdom . |
| 1464718 | 2/1977 | United Kingdom . |
| 1497577 | 1/1978 | United Kingdom . |
| 1533027 | 11/1978 | United Kingdom . |
| 2028716 | 3/1980 | United Kingdom . |
| 2043527 | 10/1980 | United Kingdom . |
| 2047616 | 12/1980 | United Kingdom . |

Primary Examiner—Edith Buffalow
Attorney, Agent, or Firm—Browdy and Neimark

[57] ABSTRACT

A thermoplastics bag whose wall has an outer layer and an inner layer, each of which is formed by melt-extrusion from an ethylene polymer, the outer layer containing an isobutylene polymer in an amount sufficient to increase the coefficient of friction. Also a multi-layer film suitable for use in the manufacture of the bag.

19 Claims, 5 Drawing Figures

PLASTICS FILM AND BAGS AND SACKS THEREFROM

This application is a continuation application Ser. No. 494,559, filed May 13, 1983 abandoned.

This invention relates to plastics film and bags and sacks made therefrom.

The production of plastics sacks and bags from film, especially blow extruded tubular film, is well known and has been widely employed for many years. Plastics compositions based on low density ethylene polymer have generally been found to provide the most desirable combination of physical properties and cost but the faces of the bags and sacks formed from such compositions are very slippery (i.e. have a high slip coefficient) and this makes their stacking and transport difficult, especially when full.

The art has been aware of this problem for over a decade and many proposals have been made for solving it. One approach has been to treat the surface of the film which is to form the outer surface of the sack in order to roughen it e.g. as proposed in GB-A-1533027 and GB-A-2043527. However, this requires an additional step in the formation of the film, and is therefore economically undesirable. Another approach has been to produce the film in the form of a laminate and to form the layer which is to provide the outer surface of the sack from a polymeric material having a relatively high coefficient of friction, e.g. as in U.S. Pat. No. 3,424,649, which proposes a blend of at least 50% up to about 83% by weight of a specified styrene-butadiene block copolymer, the balance being polyethylene. However, this requires the use of a relatively large amount of a special and therefore relatively expensive polymer. Yet another approach has been to produce the film in the form of a laminate of ethylene polymer layers and to include in the layer which is to form the outer surface of the sack a small amount of a tackifier so as to increase the coefficient of friction of that surface. Materials that have been proposed as tackifiers for that purpose include hydrocarbon resins, as in Japanese patent publication No. 79-95683, and ethylene/vinyl acetate copolymers, as in French patent specification No. 2031801. So far as we are aware, however, none of these proposals has achieved more than limited commercial success.

According to the present invention, the problem has been solved satisfactorily by providing a thermoplastics sack or bag at least one of the walls of which has an outer layer and an inner layer, each of which is formed by melt-extrusion from a polyethylene, and the outer layer contains an isobutylene polymer in an amount sufficient to increase the coefficient of friction.

The wall may consist of the two layers or may include one or more further layers lying between said outer and inner layers.

In general both of the walls of the bag or sack will have said multi-layer construction but this is not essential because the benefit of the invention can still be obtained when only one of the walls is so constructed provided that all the sacks (or bags) in a stack are arranged with the said wall facing in the same direction; i.e. either with said wall being the upper wall or the underneath wall in all the sacks in the stack.

The layers of the wall may be separate or they may be fused together, in which case the wall may be produced in a single operation e.g. by a process such as coextrusion.

Thus, the invention also provides a multi-layer film comprising a laminate wherein the external layers, i.e. the layers providing the two faces of the film, are each formed by extrusion from a polyethylene and one of said layers contains an isobutylene polymer in an amount sufficient to increase the coefficient of friction.

The layers of the film are preferably thermally fused together while at least one of them is still in the heat-softened state as a result of being melted for extrusion, and most preferably the film is formed by coextrusion.

The film may be flat film extruded from a slot die but preferably is tubular film e.g. produced by the blow extrusion process.

Bags and sacks according to the invention may be made from the film with the layer containing the isobutylene polymer providing the outer layer of the wall of the bag or sack. The bags and sacks may be formed from the film in known manner and may be of simple form or, for example, in the form of pillow sacks or valve sacks.

It has been found that by using an isobutylene polymer as the additive it is possible to achieve a higher increase in the coefficient of friction than has been possible hitherto, e.g. to a level of at least 0.8 as measured by ASTM D-1894 (static test), without producing a surface which is sticky to the touch or which becomes sticky to the touch on aging. Therefore, while the films can be processed on downstream machinery as employed in the production of bags and sacks, do not attract dust and are not unpleasant to manhandle, bags and sacks formed from them can be stacked more readily into stable piles which can be palletised and transported without difficulty by conventional means such as fork lift trucks.

It has also been found that the coefficient of friction tends to increase on aging but without any apparent increase in stickiness. In the case of at least some of the prior art proposals in which tackifiers are employed as the additives for increasing the coefficient of friction, on the other hand, either the coefficient of friction tends to decrease on aging or the additive tends to migrate to the surface and cause stickiness and severe difficulties in handling.

Adequate results are obtained with even quite small amounts of the isobutylene polymer, e.g. less than 10%, preferably less than 8% by weight and more preferably 1 to 6%, based on the weight of polyethylene in the layer and another unexpected observation is that particularly good results are obtained at low molecular weights $M_w$ (polyethylene equivalent), e.g. 1000–5000 or even less, possibly down to 800 or even 500, when employing polyisobutylene, despite the marked inherent stickiness and semi-liquid or syruppy state of such material.

Where the bag or sack is formed from a multi-layer film in accordance with the invention, the film is preferably formed by coextrusion. Co-extrusion involves extruding two or more different plastics layers through a common die to produce a multilayer product in a single step. The plastics materials forming the layers may be extruded through different orifices in the same die, whereby in the present invention the two external layers are extruded as separate entities and fuse together downstream of the die, or they may be extruded through the same orifice. The film of the present invention may have two layers, or more than two layers, if desired, thus offering the opportunity of further varying the physical properties of the film while providing the desired increase in surface coefficient of friction in one of the external layers.

In general, where the film has been produced by coextrusion both the external layers will be continuous. However the layer containing the isobutylene polymer may be discontinuous, e.g. in the form of one or more stripes or bands which may extend in the direction of extrusion or alternatively at an angle thereto in which case they will take on a helical configuration when tubular film is being produced. Alternatively, this layer may be continuous and the other external layer of the film may be discontinuous but this is less satisfactory since it may interfere with facile filling of the bag.

By arranging for the wall of the sack or bag to have two or more layers it is possible to arrange that the inner layer, and/or any other layer between the inner and outer layer where the wall has three or more layers, largely provides the desired physical properties such as puncture and tear resistance and burst strength, thereby permitting the outer layer to be formed with a substantially higher coefficient of friction than would otherwise be possible. Desirably, the outer layer will have a coefficient of friction (static), as measured in accordance with ASTM D-1894, of at least 0.8, preferably at least 0.85, more preferably at least 0.87. The coefficient of friction of the outer layer ideally should be at least equal to that of paper of the kind used in the outer layers of heavy duty paper sacks. The inner layer preferably has a coefficient of friction, measured by the same test, of less than 0.5, more preferably not greater than 0.4. It is frequently desirable for it to have a value of 0.3 or less. Such low coefficient of friction may be achieved, for example, by use of a slip agent, such as a fatty acid amide, in known manner.

By "polyethylene", as used herein, is meant a homopolymer of polyethylene or a copolymer thereof with a few percent, e.g. up to 5 mole %, of another $\alpha$-olefin, preferably an $\alpha$-olefin having from 4 to 8 carbon atoms, as in butene-1, hexene-1 and octene-1. It will be understood that where the multilayer film of the invention is to be produced by coextrusion, the polymers chosen for each of the layers must have similar processing characteristics so that both may be extruded through the same die.

In one embodiment, the layers may each comprise low density polyethylene. In a preferred embodiment, however, the layer which provides the outer face and which includes isobutylene polymer comprises linear low density polyethylene and the layer which provides the inner face comprises a polyethylene which in terms of melt processing characteristics is compatible with said linear low density polyethylene, e.g. the same or different linear low density polyethylene, a polyethylene of higher density or a mixture comprising linear low density polyethylene and a polyethylene of higher density. Another preferred embodiment has as one layer low density polyethylene and as the other type, which is preferably the layer providing the outer face, linear low density polyethylene.

Linear low density ethylene polymer is ethylene polymer having a density corresponding to that of conventional low density polyethylene, i.e. up to about 0.925 g/cm$^3$ but which has been manufactured by a low pressure process employing a metalbased catalyst such as a Ziegler, Phillips, Union Carbide, Dow or Standard catalyst, and has fewer CH$_3$- groups per 1000 carbon atoms than conventional low density polyethylene made by the high pressure process using a peroxy catalyst. In general, linear low density ethylene polymers contain a small percentage of a second $\alpha$-olefin as comonomer. Said second $\alpha$-olefin normally has at least 4 carbon atoms.

The polymer composition from which each layer is formed may also include a minor proportion of another polymeric material compatible with the polyethylene employed, e.g. ethylene copolymers containing more than about 5% $\alpha$-olefin comonomer, ethylene copolymers with other monomers and/or propylene polymers (which term includes copolymers).

While it has found that with appropriate choice of the polymer from which the layer forming the outer face is formed, the bags or sacks of the invention may be stitched using essentially the same automatic equipment as is conventionally employed with paper sacks, it may be found advantageous to coat the area of that layer which contains the isobutylene polymer and which is to be contacted by stitching or automatic bag handling machinery, e.g. the shoe of a sewing machine, with a band of a material which has a lower coefficient of friction than said layer. The coating may be applied to the bag or sack or to the appropriate face of the film from which it is to be formed. However one convenient method of achieving this is to coat the area with a band of printing ink since this may be effected simultaneously with the printing of any desired legend on the film or a bag or sack made therefrom.

In one embodiment of the invention, which is particularly desirable where the bags or sacks are to hold living horticultural produce, e.g. seeds, bulbs or corms, at least one of the layers contains an infra-red and/or ultra-violet absorber, e.g. carbon black, to inhibit premature sprouting. Preferably, the inner layer (or, where the bag or sack comprises more than two layers, an inner layer) is thus modified, thereby permitting the outer layer to be distinctively coloured e.g. for identification purposes or for appearance.

The bags and sacks or the films employed in their production may be microperforated in known manner e.g. for applications where otherwise the materials stored in them would sweat.

Bags and sacks may be made according to the invention which exhibit a combination of puncture resistance, tear strength, burst strength, tensile strength and low-slip outer surface that enables them to be employed as acceptable substitutes for heavy duty paper sacks including multi-ply sacks and provides them with a stacking capability which can exceed that of the paper sacks. Particularly good results are obtained when the bags or sacks are made from the multi-layer film of the invention, especially when the film has been produced by coextrusion.

The invention is now illustrated by the following Example. A black tubular film having an overall wall thickness of 150 microns was blow coextruded from a first composition which contained carbon black and a slip agent and in which the polymeric component was a blend of 75 parts by weight of a linear low density ethylene polymer having a density of 0.920 and containing about 3 mole % octene-1 and marketed as DOWLEX 2045 and 25 parts by weight of an ethylene polymer having a density of 0.938 and containing about 1.2 mole % hexene-1 and marketed as FINA HR 501, and a second composition in which the polymeric component was a blend having a density of about 0.919 and marketed as UNIFOS 8006 and comprising (a) a linear low density ethylene polymer containing about 3 mole % butene-1 and (b) about 3.6% by weight of a polyisobutylene having a molecular weight $M_w$ (polyethylene equivalent) in the range of about 1000 to 2000 and a broad molecular weight spread of from about 300 to about 3000. The first composition formed the inner layer of the tube and the second formed the outer which had a thickness of about 38 microns.

The outer face of the walls of sacks made from the film was found to have a coefficient of friction of 0.85 to 0.87 but was not sticky to the touch and was not unpleasant to manhandle. The inner face had a coefficient of friction below 0.5, thereby facilitating filling the sack.

A 40"×48" pallet was loaded with 1 tonne of produce packed into 40 sacks stacked in 8 layers of 5 sacks per layer. Using the sacks of the invention, the stack was still stable after tipping the pallet about one of its 48" edges until the opposite edge was more than 20" off the ground.

There was no evidence of deterioration of the frictional properties or of stickiness developing in the surface of the sacks of the invention even after several months storage. Moreover, the sacks were found to stack better than paper sacks and have higher resistance to water penetration, improved printability and better inhibition of the germination of seed products packed in them. They can be stitched like paper sacks or heat sealed, and can be stored outside.

Figure 2:
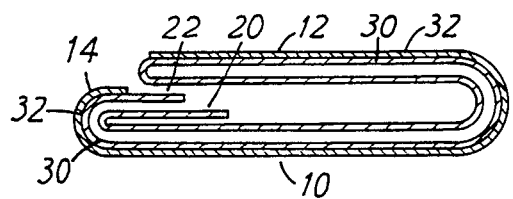
Figure 3:
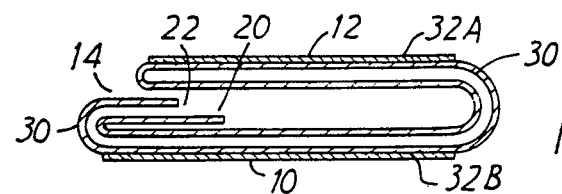
Figure 4:
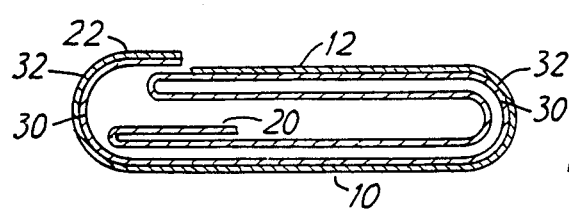
Figure 5:
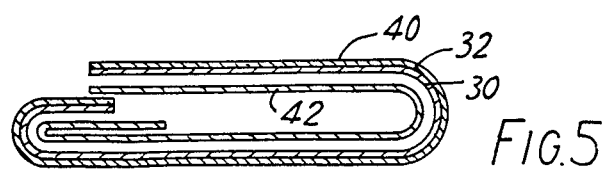

A method of forming a valve bag in accordance with the invention is now described with the aid of the accompanying drawings in which FIG. 1 is an elevational view of a bag made from a single ply of film, FIG. 2 is a sectional view along line A—A of FIG. 1, FIG. 3 shows a modification of the bag of FIG. 2, FIG. 4 is a view corresponding to that of FIG. 2 but of a different form of bag, and FIG. 5 is a view corresponding to that of FIG. 2 of a bag similar in construction to that of FIGS. 1 and 2 but formed from two separate plies.

Referring to FIGS. 1 and 2, the bag 2 has a two-ply back wall 10 and a front wall made of two-ply partially overlapping panels 12 and 14 which are integral with the back wall whereby to from therewith a flattened two-ply tube which is closed at both ends by transverse seals 16 and 18. Panel 14 lies beneath panel 12 in the area of overlap and the free edge of its inner ply 20 projects a short distance beyond the free edge of its outer ply 22. A seal 24 unites both plies of panel 14 with the two plies of panel 12 and a seal 26 unites the projecting end of ply 20 wih the two plies of panel 12. The portion left unsealed in the common area of overlap at the top end of the bag forms a tubular valve sleeve which is delineated by the top ends of seals 24 and 26 together with seals 28. The projecting end portion of inner ply 20 acts as a closing flap when the bag has been filled.

It will be understood that in an alternative embodiment, outer ply 22 may project beyond inner ply 20. Furthermore, seal 26 is not essential and seals 28 may be replaced by a continuous seal. In yet another embodiment, illustrated in FIG. 4, outer ply 22 can extend over panel 12 instead of beneath it; in other words the portion of panel 12 which overlaps panel 14 lies between plies 20 and 22.

The bag is formed by folding and sealing a flat film or folded slit tubular film only part of the width of which is provided, over at least a part of one surface thereof, with the layer containing the isobutylene polymer, said part of the width being that which provides the external faces of the walls of the bag. That part of the width of the film which provides the inner surfaces of the bag is not provided with this layer. Thus, in the embodiment illustrated in FIGS. 1 and 2 the bag is formed from a film which comprises a first layer 30 of polyethylene (as herein defined) and a second layer 32 comprising polyethylene and also containing isobutylene polymer in an amount which increases the surface coefficient of friction. This layer is in the form of a band whose width corresponds with that part of the film which provides the external faces of walls 10, 12 and 14 of the bag.

Not all of the width of the film which provides the external faces of the bag need be provided with the layer 32. For example, as illustrated in FIG. 3, the layer may be provided as two separate bands 32A and 32B which provide the external faces of panels 10 and 12, respectively.

In the embodiment illustrated in FIG. 5, the bag of FIGS. 1 and 2 is formed instead from two plies 40 and 42 at least the outer ply 40 being a multilayer film of this invention with the outer layer containing isobutylene polymer. The inner ply 42 may comprise the same multilayer film, in which case the layer which does not contain isobutylene polymer preferably faces inwards whereby to form the inner face of the bag, or, as shown in FIG. 5, it may comprise a different film provided it can be sealed, e.g. by heat sealing, to the outer ply 40.

I claim:

1. A thermoplastics sack or bag at least one of the walls of which has an outer layer and an inner layer, each of which is formed by melt-extrusion from a polymer composition selected from the group consisting of (a) at least one polyethylene selected from the group consisting of homopolymers of ethylene and copolymers of ethylene with up to 5 mole % of at least one other α-olefin and (b) blends of at least one said polyethylene with minor proportions of other polymeric materials compatible therewith, and the outer layer contains an isobutylene polymer in an amount sufficient to increase the coefficient of friction, and wherein the surface of said inner layer has a lower coefficient of friction than that of said outer layer.

2. A sack or bag as claimed in claim 1 in which the layers are fused together.

3. A sack or bag as claimed in claim 2 in which said layers are formed by coextrusion.

4. A sack or bag as claimed in claim 3 in which the isobutylene polymer is present in the outer layer in an amount of less than 10% by weight, based on the polyethylene in the layer.

5. A sack or bag as claimed in claim 4 in which the isobutylene polymer is present in the outer layer in an amount of less than 8% by weight.

6. A sack or bag as claimed in claim 5 in which the isobutylene polymer is present in the outer layer in an amount of from 1% to 6% by weight.

7. A sack or bag as claimed in claim 4 wherein the isobutylene polymer is polyisobutylene.

8. A sack or bag as claimed in claim 7 in which the polyisobutylene has a molecular weight $M_w$ (polyethylene equivalent) in the range of 500 to 5000.

9. A sack or bag as claimed in claim 1 in which the surface coefficient of friction of the outer layer, as measured by ASTM D-1894 (static test), is at least 0.8.

10. A sack or bag as claimed in claim 9 in which the surface coefficient of friction of the outer layer, as measured by ASTM D-1894 (static test), is at least 0.85.

11. A sack or bag as claimed in claim 10 in which the surface coefficient of friction of the outer layer, as measured by ASTM D-1894 (static test), is at least 0.87.

12. A sack or bag as claimed in claim 1 in which the surface coefficient of friction of the inner layer, as measured by ASTM D-1894 (static test), is less than 0.5.

13. A sack or bag as claimed in claim 1 in which said outer and inner layers each comprise low density polyethylene.

14. A sack or bag as claimed in claim 1 in which the outer layer comprises linear low density polyethylene.

15. A sack or bag as claimed in claim 14 in which the inner layer comprises a material selected from the group consisting of linear low density polyethylene, a polyethylene of higher density or a mixture of linear low density polyethylene and a polyethylene of higher density.

16. A sack or bag as claimed in claim 1 in which one of the layers comprises low density polyethylene and the other comprises linear low density polyethylene.

17. A sack or bag as claimed in claim 16 in which said other layer is the outer layer.

18. A thermoplastic sack or bag as claimed in claim 1 wherein said other polymeric materials are selected from the group consisting of ethylene/alpha-olefin copolymers containing more than about 5% alpha-olefin and polymers of propylene.

19. A sack or bag in accordance with claim 9 in which the isobutylene polymer is present in the outer layer in an amount of less than 10% by weight, based on the polyethylene in the layer; and the surface coefficient of friction of the inner layer, as measured by ASTM D-1894 (static test), is less than 0.5.

* * * * *